(No Model.) 2 Sheets—Sheet 1.

W. C. KANTNER.
ORGAN ACTION.

No. 264,705. Patented Sept. 19, 1882.

Witnesses:
Samuel P. Kinsey
Frank P. Kinsey

Inventor:
Washington C Kantner
per Thomas P. Kinsey
Atty (No Model.)  
2 Sheets—Sheet 2.
W. C. KANTNER.
ORGAN ACTION.
No. 264,705.  
Patented Sept. 19, 1882.
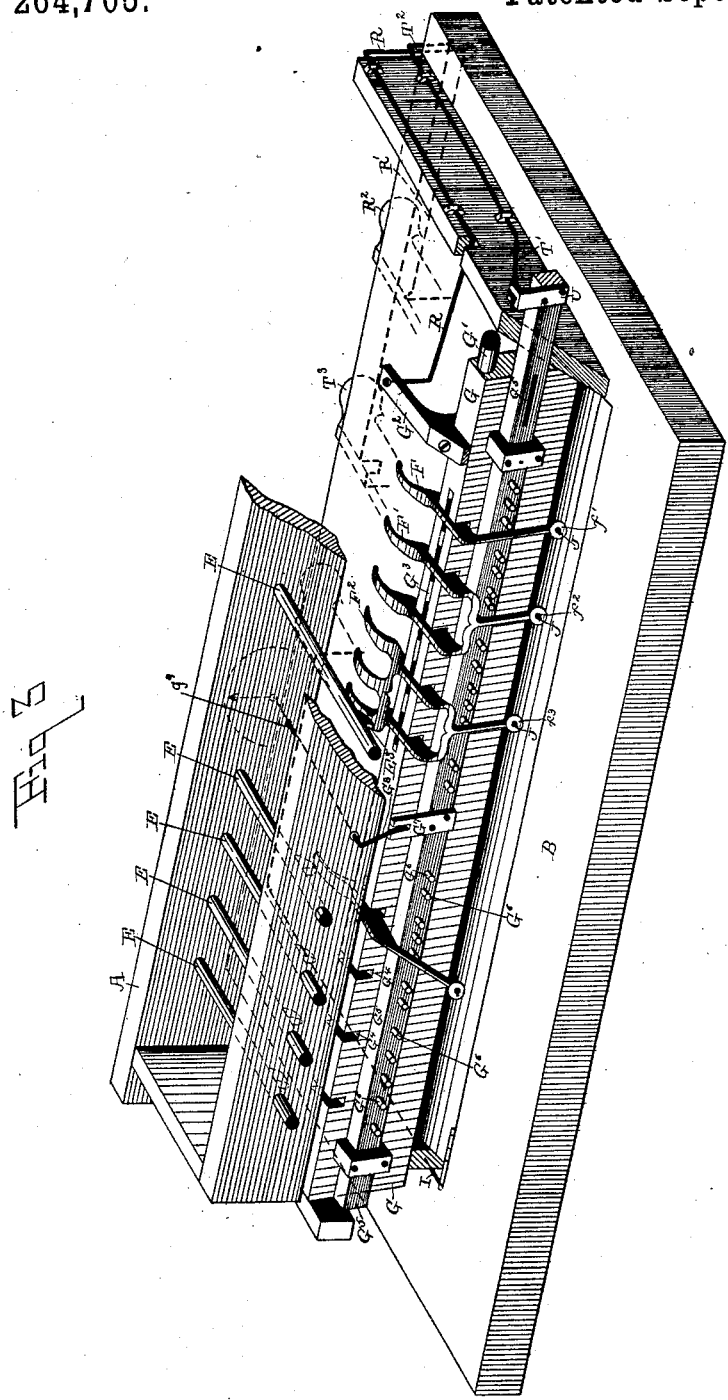
Witnesses:
Samuel T. P. Kinsey.
Frank P. Kinsey.
Inventor:
Washington C. Kantner

UNITED STATES PATENT OFFICE.

WASHINGTON C. KANTNER, OF READING, PENNSYLVANIA.

ORGAN-ACTION.

SPECIFICATION forming part of Letters Patent No. 264,705, dated September 19, 1882.

Application filed March 20, 1882. (No model.)

*To all whom it may concern:*

Be it known that I, WASHINGTON C. KANTNER, of the city of Reading, county of Berks, State of Pennsylvania, have invented a new and useful Improvement in Organ-Actions, of which the following is a specification.

This improvement relates more particularly to the action of reed or parlor organs, although applicable with slight modification to all pipe or church organs of modern construction. Musicians have long thought it desirable, but in their opinion unattainable, to secure the complete control of the various banks of reeds or pipes while in the act of playing without the necessity of removing their hands from the keys to manipulate the draw-stops, which, besides taxing the strength of the performer, diverts his mind from the music and causes more or less abruptness in the rendering of the same.

Figure 1:
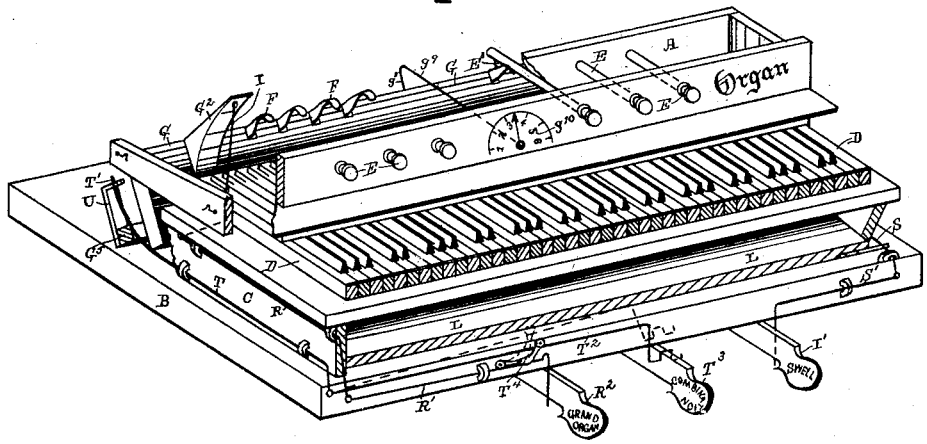
Figure 2:
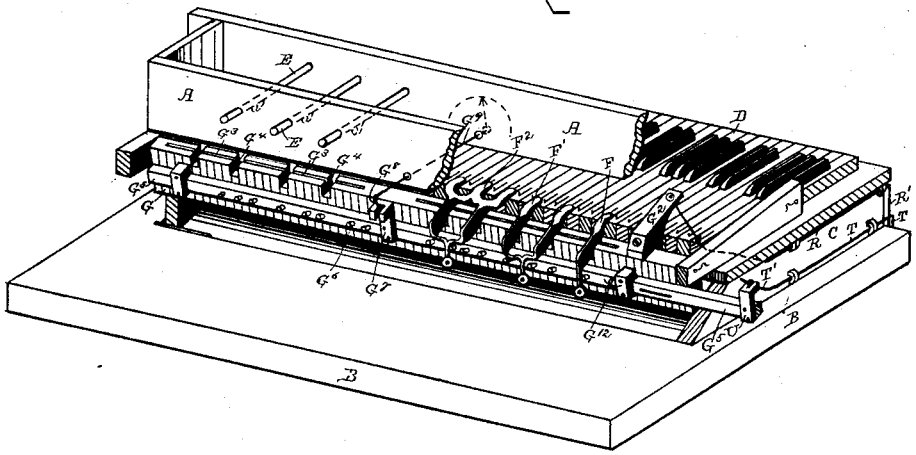

Referring to the drawings herewith, and which form part of this specification, Figure 1, Sheet 1, is a perspective front view of so much of an organ-action as is necessary to illustrate my invention. Fig. 2, Sheet 1, is a rear view, also in perspective. Fig. 3, Sheet 2, is a perspective plan with the key-board removed and the invention, for sake of clearness, shown on a much larger scale.

Similar letters of reference indicate similar parts of the invention.

The object of my invention is to give the performer more complete control of the articulation of the organ, and to relieve him of the hardest work connected with organ-playing, which at times, to give full effect to the music, demands a distracting attention to stops and pedals.

There have at various times attempts been made to secure the above results, but thus far only to a partial extent, and all the cases known to me were so complicated and liable to derangement as to bar their practical application.

My improvement, on the contrary, so simplifies the manner of producing the desired effect and is so inexpensive in its application as to bring it within reach of all interested in organ-playing and grand musical expression.

The invention is more particularly applicable to organs provided with the rocker-bar and bell-crank action shown in my patent reed-organ stop-action, No. 252,674, January 24, 1882, but may at a small expense be added to any reed-organ now in use.

Referring to the lettering of the drawings, A represents the frame; B, the reed-bed; C, the wind-box; D, the keys; E, the stop-pulls, provided with modulator-blocks; $E^3$, modulator-blocks; F, single-acting bell-cranks; $F'$, double-acting and $F^2$ triple-acting cranks; G, rocker-bar; $G'$, rocker-bar pivots; $G^2$, lever or arm of rocker-bar; $G^3$, grooved seat for fulcrum-pins of bell-cranks; $G^4$, notches in bar to admit bell-cranks; $G^5$, arrester or combination bar; $G^6$, pins or notches defining movement of cranks F $F'$ $F^2$; I, a rod-connection from the rocker-bar arm to the ordinary knee-swell; $I'$, knee-swell pedal; J, direct connection with the front mutes and bell-cranks; L, mutes; R $R'$, pull-rods to the coupler for grand organ; $R^2$, grand-organ knee-pedal; S $S'$, rods for ordinary knee-swell pedal $I'$ to the swell-mutes; T $T'$ $T^2$, rods for the combination or arrester bar $G^5$, connecting with $T^3$, the central knee or combination pedal; U, an arm at the end of the bar $G^5$, having a bifurcated right-angled bent top, in which the rod $T'$ works, and through which the bar is shifted longitudinally in the brackets in the bar G. A disengaging arm or lever, $T^4$, is placed in contact with the rods $R'$ and $T^2$, so adjusted with relation to each that while the grand organ is on or the pedal $R^2$ is pressed toward the left the rod $T^2$ will be out of gear with the combination-pedal $T^3$, and when $T^3$ is engaged with $T^2$ then $T^4$ will drop out of the way, and the motion of the arrester-bar $G^5$, through the action of the combination-pedal $T^3$, is unobstructed.

The improvement consists in a bar, $G^5$, moving freely in brackets secured to the rocker-bar or its equivalent in the rear of the bell-cranks or their equivalent mute operators. The movement of said bar in a longitudinal direction is controlled by a combination of rods T $T'$ $T^2$, with an auxiliary central or combination knee-pedal, $T^3$, placed intermediate to the grand-organ and swell knee-pedals where both are supplied, or as an auxiliary knee-pedal in combination with the grand-organ pedal. I shall style it the "combination-pedal." The bar G⁵ is provided with a series of pins, G⁶, so arranged with relation to the movement of the bar as to either fall immediately behind the bell-crank or mute arms or upon each side of the same with sufficient freedom between the pins to admit the tail or lever of the mute-operators. In place of the pins, the bar G⁵ may have perforations large enough to freely admit the pins; and the pins may then be arranged upon the tails of the levers F F' F². The pins or perforations, or the equivalent therefor, are so arranged that the movement of the bar G⁵ to any definite extent shall bring the pins and levers in juxtaposition or offer a clearance-space for the crank arms or their equivalent between the same.

It will be seen that the arrester-bar G⁵ partakes of the oscillating movement imparted to the rocker-bar G by the arm G² and connections from the grand-organ pedal R². Now, the rocker-bar in its normal position hangs with its face clear of the tails of the levers F F' F², the space between the face of the rocker-bar and the tails being sufficient to permit the arrester-bar G⁵, with its projecting pins G⁶, to pass freely between the same. Now, the pins G⁶ are so arranged upon the bar that a certain movement of the combination-pedal T³ will bring the pins behind, say, two of the mute-couplers, and an additional movement may bring them behind three or four couplers more, and the next movement may, as the pins have been adjusted, release one or more of the pins previously brought in range with the couplers and place them in the rear of an entirely different set. In either case while playing these different movements can be made, the dial, as already described, showing the combination that will be operated; and the movement of the grand-organ pedal R² will unlock the connection with the central pedal, T³, and on oscillating the rocker-bar, each coupler-tail having a pin, G⁶, behind, it will be operated by contact therewith. In regard to the pull-stops, when drawn full out the operation throws the tail of the couplers so far from the face of the rocker-bar that when the same is oscillated by the grand-organ pedal neither the pins nor bar will contact with the same, and the action of the pull-stops is as if the organ were unprovided with an arrester-bar.

The various positions of the pins or perforations having been determined by the manufacturer from the effect he is desirous of having produced, the performer, sitting with the combination knee-pedal between his knees, the grand-organ knee-pedal to the left, and the swell knee-pedal to the right, (or vice versa, as they may be arranged,) may by the movement of the combination knee-pedal to the right or left with a slow or rapid motion, according to the effect to be produced, bring into or throw out of action the several banks of reeds or pipes, consecutively or as a whole, producing the most startling transposition with the aid of the grand-organ pedal without removing his hands from the keys or taxing his strength and mental faculties by the manipulation of the draw-stops.

To indicate to the performer the various actions thrown on or released by the movement of the bar G⁵, I attach thereto and moving with it an arm, G⁷, which acts upon the short arm of a horizontal shaft, $g^8$, lying at right angles with the bar. The opposite end of the shaft $g^8$ is provided with an arm, $g^9$, of much greater length, which is projected in front of the name-board, where it can be easily seen by the performer. To this arm I attach an indicator of ornamental design, and on a quadrant or semicircular dial, $g^{10}$, to which the arm is radius, I mark with numerals or words the actions affected by the various movements of the bar, and the combination knee-pedal in its movement to the right or left, operating the bar G⁵ with its arm G⁷, and through it the crank of the shaft $g^8$, owing to the increased length of the arm $g^9$, causes the indicator to travel over considerable space for a slight movement of the bar or combination knee-pedal, thus permitting the use of large numerals or full words easily seen by the player.

To retain the bar G⁵ in position when not pressed by the combination knee-swell, I place a spring or friction pad, $g^{12}$, in combination with one of the brackets, so as to create sufficient friction upon the bar to prevent its spontaneous movement, yet leaving it free to be moved by the slightest effort of the combination-pedal T³.

It will be evident to a musician or an expert in organ-building that, having with the central or combination knee-swell adjusted the position of the arrester-bar in the rear of the bell-cranks or mute-levers by a movement of the pedal to the right or left, in accordance with the effect to be produced, and which is indicated upon the dial $g^{10}$ by the arm $g^9$, and then thrown the grand organ into action, the combination of mutes or couplers indicated by the hand upon the dial will be operated, thus relieving the performer of the trouble of drawing the stops when a combination different from that of the grand organ or of the stops already drawn out is desired.

Having described my invention, its mode of operation, and the effects to be produced thereby, I desire to secure by Letters Patent the following claims:

1. In an organ-action for parlor reed or church pipe organs, a movable arrester-bar, G⁵, secured to a rocker-bar, G, or its equivalent, by brackets thereon, and through which it has a longitudinal movement, provided with an arm, U, bent at right angles at the top and bifurcated, and adapted to be operated by the rods T T' T² and knee-pedal T³, an arm, G⁷, suitably placed and adapted to operate a shaft, $g^8$, an arm, $g^9$, in combination with a dial, $g^{10}$, and provided with a series of pins or perforations, which, in operating the bar, are thrown behind or between the tails of the bell-cranks or mute-levers F F' F², in combination with the grand-organ action, mutes L, and swell M, substantially as and for the purpose specified.

2. In an organ-action, as described, the central combination knee-pedal, T³, arranged and adapted to operate an adjustable arrester-bar, G⁵, in combination with the rods T T' T², arm U, and the usual grand-organ or swell pedals, or a combination of the same, whereby the performer is enabled without manipulating the stop draws to produce all the effect that the drawing of the same would produce, substantially as shown, described, and for the purpose specified.

3. In an organ-action, as described, the central knee-pedal, T³, arranged and adapted to operate an adjustable combination or arrester-bar, G⁵, in combination with the rocker-bar G, bell-cranks F F' F², pull-stops E, and modulator-blocks E³, whereby, although a portion of the stops E may be drawn out, the performer, without removing his hands from the keys or ceasing to play, will, by the movement of the combination-pedal T³, produce the same effect as he would have secured by the drawing out of the remaining pull-stops, or vice versa, substantially as and for the purpose set forth.

4. The combination, with the stop-levers F F' F² of an organ-action, as described, of the pedal T³, grand-organ pedal R², bar G⁵, having pins G⁶, the rocking bar G, with its arm G², and the connecting-rods, all constructed and arranged to operate as set forth.

WASHINGTON C. KANTNER.

Witnesses:
F. PIERCE HUMMEL,
THOMAS P. KINSEY.